US00RE34180E

United States Patent [19]

Nemeth, deceased et al.

[11] E Patent Number: Re. 34,180

[45] Reissued Date of Patent: Feb. 16, 1993

[54] PREFERENTIALLY BINDER ENRICHED CEMENTED CARBIDE BODIES AND METHOD OF MANUFACTURE

[75] Inventors: Bela J. Nemeth, deceased, late of Greensburg, by Nancy A. Nemeth, executrix; George P. Grab, Greensburg, both of Pa.

[73] Assignee: Kennametal Inc., Latrobe, Pa.

[21] Appl. No.: 243,089

[22] Filed: Sep. 9, 1988

Related U.S. Patent Documents

Reissue of:

[64] Patent No.: 4,610,931
Issued: Sep. 9, 1986
Appl. No.: 587,584
Filed: Mar. 8, 1984

U.S. Applications:

[63] Continuation of Ser. No. 248,465, Mar. 27, 1981, abandoned.

[51] Int. Cl.[5] ..... B22F 3/16; B22F 7/02

[52] U.S. Cl. ..... 428/547; 428/552; 428/565; 75/241; 75/242; 75/238; 419/14; 419/16; 419/45; 419/55; 419/60

[58] Field of Search ..... 428/547, 551, 565, 610, 428/552; 75/201, 203, 204, 208 R, 241, 242, 240, 238, 239; 148/126; 419/18, 15, 16, 45, 47, 14, 13, 55, 60

[56] References Cited

U.S. PATENT DOCUMENTS

| | | | |
|---|---|---|---|
| Re. 29,420 | 9/1977 | Lindstrom et al. | 428/336 |
| 1,829,158 | 10/1931 | Roux | 419/18 |
| 2,015,536 | 9/1935 | Schroter | 75/1 |
| 2,074,847 | 3/1937 | Lemaigre | 75/238 |
| 2,123,046 | 7/1938 | Hinnuber | 75/136 |
| 2,979,811 | 4/1961 | Toney | 29/182.7 |
| 3,322,513 | 5/1967 | Corbett | 75/203 |
| 3,564,683 | 2/1971 | Schedler et al. | 29/95 |
| 3,616,506 | 11/1971 | Ekemar | 29/95 |
| 3,703,368 | 11/1972 | Rudy | 75/175.5 |
| 3,736,107 | 5/1973 | Hale | 29/182.7 |

(List continued on next page.)

FOREIGN PATENT DOCUMENTS

| | | |
|---|---|---|
| 622347 | 11/1935 | Fed. Rep. of Germany . |
| 650001 | 8/1937 | Fed. Rep. of Germany . |
| 2263210 | 8/1973 | Fed. Rep. of Germany . |
| 2435989 | 2/1976 | Fed. Rep. of Germany . |
| 2625940 | 12/1976 | Fed. Rep. of Germany . |
| 2646433 | 4/1977 | Fed. Rep. of Germany . |
| 2812186 | 9/1978 | Fed. Rep. of Germany . |

(List continued on next page.)

OTHER PUBLICATIONS

T. Hale, "Sintering of Cemented Carbides", Metals Handbook, 9th Ed., vol. 7, Powder Metallurgy, Jun. 1984, pp. 385-389.
R. L. Sands et al., Powder Metallurgy, Chap. 6, "Tool Materials", pp. 135-155.
Sandvik—New Product Data.
Jul. 1977, Sandvik Product Profile of GC015.
Sandvik promotional letters for GC015 dated Aug. 22, 1977 (two).
Sandvik Marketing Memo of Jul., 1977 for GC015.
Product literature entitled "Sandvik's Grade GC015".
Product literature entitled "Sandvik GC Standard Insert Program".
Sandvik Product literature entitled "New Product Data GC1025".
Product literature entitled "WIDATUR—The New Formula for Coated Hardmetal".
Sumitomo C-Line Insert brochure (dated Jan., 1978).

(List continued on next page.)

*Primary Examiner*—John Zimmerman
*Attorney, Agent, or Firm*—John J. Prizzi; Stephen T. Belsheim

[57] ABSTRACT

Cemented carbide substrates having substantially A or B type porosity and a binder enriched layer near its surface are described. A refractory oxide, nitride, boride, and/or carbide coating is deposited on the binder enriched surface of the substrate. Binder enrichment is achieved by incorporating Group IVB or VB transition elements. These elements can be added as the metal, the metal hydride, nitride or carbonitride.

107 Claims, 2 Drawing Sheets

U.S. PATENT DOCUMENTS

| | | | |
|---|---|---|---|
| 3,836,392 | 9/1974 | Lux et al. | 117/169 R |
| 3,915,665 | 10/1975 | Kalish | 29/195 |
| 3,918,138 | 11/1975 | Nemeth et al. | 75/203 |
| 3,947,616 | 3/1976 | Ritsko et al. | 427/430 |
| 3,971,656 | 7/1976 | Rudy | 75/203 |
| 3,994,692 | 11/1976 | Rudy | 29/182.5 |
| 3,999,954 | 12/1976 | Kolaska et al. | 75/203 |
| 4,018,631 | 4/1977 | Hale | 148/31.5 |
| 4,019,873 | 4/1977 | Reiter | 428/217 |
| 4,035,541 | 7/1977 | Smith et al. | 428/642 |

(List continued on next page.)

FOREIGN PATENT DOCUMENTS

| | | |
|---|---|---|
| 2225135 | 7/1980 | Fed. Rep. of Germany . |
| 7137605 | 6/1972 | France . |
| 66606 | 5/1973 | Japan . |
| 52-110209 | 9/1977 | Japan . |
| 89805 | 8/1978 | Japan . |
| 53-131909 | 11/1978 | Japan . |
| 28316 | 3/1979 | Japan . |
| 54-87719 | 7/1979 | Japan . |
| 91953 | 7/1980 | Japan . |
| 91954 | 7/1980 | Japan . |
| 91955 | 7/1980 | Japan . |
| 154559 | 12/1980 | Japan . |
| 56-9365 | 1/1981 | Japan . |
| 7207037 | 10/1972 | Netherlands . |
| 110513 | 10/1953 | New Zealand . |
| SE80/00015 | 1/1980 | PCT Int'l Appl. . |

(List continued on next page.)

OTHER PUBLICATIONS

"Development of ACE Coat Series", Yamamoto et al., Sumitomo Elec. Tech. Rev. No. 18 Dec. 1978.

"New Cutting Tool Materials and Designs", Metalworking Engineering and Marketing, Mar. 1980, pp. 50-52.

Meyer and Eibender, "Die Sinterung von Hartmetall-Legierungen", Archiv für das Eisenhüttenwesen, 11, May 1938 pp. 545-562.

Jones, W. D. "The Sintering of Hard-Metal Alloys" Metallurgisf, Oct. 26, 1938 pp. 171-175 @ p. 172.

Showa 55 (1980) Autumn Grand Meeting Preliminary Publication—"1-2 A $\beta$-free layer generated on the surface of a sintered nitrogen-containing WC-$\beta$Co alloy".

Schroeter, K. "Inception and Development of Hard Metal Carbides", Iron Age, 1934, pp. 27-29.

Schroeter, K., "Analysis of Hard Metal Carbide Theory", Iron Age Feb. 22, 1934, pp. 21-23.

Jones, W. D., "Progress in the Sintering of Metal Powders "The Metallurgist", Feb. 22, 1935, pp. 10-13.

"Manufacture of Cemented Carbides", Metal Progress vol. 36, No. 3 Sep. 1939 pp. 247-255.

Borden, H., "The Manufacture and Use of Cemented Carbides", Engineering, Jan. 31, 1941 pp. 86-87, 145-146.

"Cemented Carbide Manufacture and Applications", Wire and Wire Products, vol. 17 No. 10, pp. 574-579 (Oct. 1942).

"The Preparation and Properties of Cemented Carbides", Australian Inst. Mining and Metallurgy No. 128 pp. 227-257, Dec. 31, 1942.

"An Investigation into the Conditions of Preparation of Cemented Tungsten Carbide", Australian Inst. Mining and Metallurgy, No. 128 pp. 259-272, Dec. 31, 1942.

"Powder Metallurgy As Applied to Cemented Carbides", Trans. Can. Inst. Mining & Met. 1944, pp. 393-414.

Kobori, K., Veki, M., Taniguchi, Y. and Suzuki, H., "Binder Enriched Layer Formed Near the Surface of Cemented Carbide", Powder and Powder Metallurgy, vol. 34, No. 3, pp. 129-132 (1987).

Suzuki, H., Taniguchi, Y., Hayashi, K., Sanuan, C, "The B-Free Layer Formed Near the Surface of Sintered WC-C-Co Alloy Containing Nitrogen", *Nippon Kinzoku Gakkaishi,* vol. 45, No. 1, pp. 95-99 (1981).

Hayashi, K., Suzuki, H., Doi, Y., "Effects of B-Free Layer of the Substrate on the Properties of Cemented Carbide Coated with Titanium Carbide by CVD", *Funtai oyobi Funmatsu Yakin,* vol. 32, No. 7, pp. 278-281 (1985).

Suzuki, H., Hayashi, K., and Taniguchi, Y., "The Formation of B-Free Layer Near the Surface of WC-B-Co Alloy Containing Nitrogen", *Funtai oyobi Funmatsu Yakin,* vol. 2, No. 2, pp. 54-57 (1982).

Pages 301-303 from the text "Sintered Cemented Carbide and Sintered Hard Material" edited by Dr. Hisashi Suzuki (Maruzen).

Pochet to Decesaris Kennametal Memorandum dated Nov. 20, 1973.

Teledyne Firth-Sterling cutting insert as reported in Kennametal Lab Report R2939 dated Jan. 20, 1976.

Greenleaf TI6 cutting insert as reported in Kennametal Lab Report R2973 dated Sep., 1976.

Sandvik GC015 cutting insert as reported in Kennametal Lab Report R2994 dated Oct. 14, 1976.

Valenite TiN coated cutting insert as reported in Ken- (List continued on next page.)

U.S. PATENT DOCUMENTS

| | | | |
|---|---|---|---|
| 4,046,517 | 9/1977 | Soga | 428/539.9 |
| 4,047,897 | 9/1977 | Tanaka | 428/439.1 |
| 4,049,876 | 9/1977 | Yamamoto et al. | 428/932 |
| 4,101,703 | 7/1978 | Schintlmeister | 428/216 |
| 4,150,195 | 9/1979 | Tobioka et al. | 428/548 |
| 4,150,984 | 4/1979 | Tanaka et al. | 75/238 |
| 4,162,338 | 7/1979 | Schintlmeister | 427/249 |
| 4,277,283 | 7/1981 | Tobioka et al. | 75/238 |
| 4,279,651 | 7/1981 | Fujimori et al. | 75/233 |
| 4,300,952 | 11/1981 | Ingelstrom et al. | 419/16 |
| 4,497,874 | 2/1985 | Hale | 428/551 |
| 4,830,930 | 5/1989 | Taniguchi et al. | 428/547 |

FOREIGN PATENT DOCUMENTS

| | | |
|---|---|---|
| 322349 | 6/1970 | Sweden . |
| 357984 | 5/1973 | Sweden . |
| 7706706 | 5/1979 | Sweden . |
| 391984 | 5/1932 | United Kingdom . |
| 395134 | 5/1932 | United Kingdom . |
| 439379 | 12/1935 | United Kingdom . |
| 465323 | 7/1936 | United Kingdom . |
| 478534 | 11/1936 | United Kingdom . |
| 763409 | 12/1956 | United Kingdom . |
| 1069975 | 5/1967 | United Kingdom . |
| 1115908 | 6/1968 | United Kingdom . |
| 1192726 | 5/1970 | United Kingdom . |
| 1284030 | 8/1972 | United Kingdom . |
| 1332878 | 10/1973 | United Kingdom . |
| 1393115 | 5/1975 | United Kingdom . |
| 1393116 | 5/1975 | United Kingdom . |
| 1404752 | 9/1975 | United Kingdom . |
| 1479231 | 7/1977 | United Kingdom . |
| 1544436 | 4/1979 | United Kingdom . |
| 1593326 | 7/1981 | United Kingdom . |

OTHER PUBLICATIONS nametal Lab Report R3031 dated Sep. 28, 1977.

Iscar IC24 cutting insert as reported in Kennametal Lab Report R3044 dated Jan. 30, 1978.

Sumitomo AC720 cutting insert as reported in Kennametal Lab Report R3079 dated Feb. 13, 1979.

Sumitomo AC815 cutting insert as reported in Kennametal Lab Report R3086 dated Feb. 26, 1979.

Firth-Sterling HfN coated cutting insert as reported in Kennametal Lab Report R3111 dated Sep. 26, 1979.

Sumitomo AC720 cutting insert as reported in Kennametal Lab Report R3125 dated Feb. 15, 1980.

Mitsubishi U77 and B221 cutting inserts as reported in Kennametal Lab Report R3126 dated Feb. 15, 1980.

Sandvik Coromat TiC coated insert as reported in Kennametal Lab Report R2868 dated Oct. 31, 1973.

Greenleaf TI6 cutting insert as reported in Kennametal Lab Report dated Jun. 26, 1974.

Firth-Sterling HfN coated cutting insert as reported in Kennametal Lab Report R3002 dated Dec. 9, 1976.

Sandvik cutting insert as reported in Kennametal Lab Report R3118.

SurfTech cutting insert as reported in Kennametal Lab Report R2974.

Carboloy Grade 570 cutting insert as reported in Kennametal Lab Report R3030 dated Sep. 29, 1977.

Carboloy Grade 570 cutting insert as reported in Kennametal Lab Report R3050.

"State of the Art and Future Prospects", VDI Journal No. 13 Jul. (1980), pp. 155-159.

Kieffer & Benesovsky, "Hartmetalle," (1965) pp. 19, 76, 88, 89, 99-105 & 188-216 (Springer-Verlag, Vienna & New York).

N. Rieter, "Hard Metal Cutting Materials—State of the Art and Prospects", XD1-Zeitschrift No. 13 (1980) pp. 150-159.

N. Rieter, "Coated Hardmetals", Technica 10 (1977), pp. 725-730.

1-3 Influences of TN on Mechanical Characteristics and Cutting Performance, Particle Technology and Powder Metallurgy Association, Summaries of Reports in the 1980 Autumn Meeting, Yoshimura et al.

The Structure of Sintered Hard Metals Particularly Tungsten Carbide-Titanium Carbide-Cobalt Alloys, Powder Metallurgy Bulletin vol. 2 (1947), Kieffer, R.

1-2 Beta Depleted Layers Produced in the Surfacial Parts of Sintered Parts of Nitrogen-Containing WC-Beta-Co Alloys, Particle Technology and Powder Metallurgy Association, Summaries of Reports in the 1980 Autumn Meeting, Taniguchi et al.

Schmtimeister, "Sintering", Pulvermetallurgic and Sinterwerkstoffe", Metallworke Plansee Lecture Program, 2nd Ed. Metallworke Plansee AG & Co., Reutte (1980), pp. 41-58.

Techn. Mitterlungen, 64th Ed., No. 1/2, Jan.-Feb. pp. 23-32.

Transactions of the Japan Institute of Metals, vol. 22 Nov. 1981, No. 11, pp. 758-764.

PREFERENTIALLY BINDER ENRICHED CEMENTED CARBIDE BODIES AND METHOD OF MANUFACTURE

Matter enclosed in heavy brackets [ ] appears in the original patent but forms no part of this reissue specification; matter printed in italics indicates the additions made by reissue.

This is a continuation of application Ser. No. 248,465, filed Mar. 27, 1981, now abandoned.

BACKGROUND OF THE INVENTION

The present invention pertains to the fields of cemented carbide parts, having cobalt, nickel, iron or their alloys as a binder material, and the manufacture of these parts. More particularly, the present invention pertains to cemented carbide metal cutting inserts having a hard refractory oxide, nitride, boride, or carbide coating on their surface.

In the past, various hard refractory coatings have been applied to the surfaces of cemented carbide cutting inserts to improve the wear resistance of the cutting edge and thereby increase the cutting lifetime of the insert. See, for example, U.S. Pat. Nos. 4,035,541 (assigned to applicant corporation); 3,564,683; 3,616,506; 3,882,581; 3,914,473; 3,736,107; 3,967,035; 3,955,038; 3,836,392; and U.S. Pat. No. 29,420. These refractory coatings, unfortunately, can reduce the toughness of cemented carbide inserts to varying degrees. The degree of degradation depends at least in part on the structure and composition of the coating and the process used for is deposition. Therefore, while refractory coatings have improved the wear resistance of metal cutting inserts, they have not reduced the susceptibility of the cutting edge to failure by chipping or breakage, especially in interrupted cutting applications.

Previous efforts to improve toughness or edge strength in coated cutting inserts revolved around the production of a cobalt enriched layer extending inwardly from the substrate/coating interface. It was found that cobalt enrichment of the surface layers in certain C porosity substrates could be achieved during vacuum sintering cycles. These cobalt enriched zones were characterized by A porosity while most of the bulk of the substrate had C porosity. Solid solution carbide depletion was usually present to varying depths and degrees in the areas of cobalt enrichment. Cobalt enrichment is desirable in that it is well known that increasing cobalt content will increase the toughness or impact resistance of cemented carbides. Unfortunately, the level of enrichment produced is difficult to control in C porosity substrates. Typically, a coating of cobalt and carbon was formed on the surface of the substrate. This coating of cobalt and carbon was removed prior to deposition of the refractory material on the substrate, in order to obtain adherent bonding between the coating and substrate. At times, the level of cobalt enrichment in the layers beneath the surface of the substrate was so high that it had an adverse effect on flank wear. As a result, sometimes the layer of cobalt enrichment on the flank faces of the substrate were ground away leaving cobalt enrichment only on the rake faces and the possibility of C porosity material on the flank face. In comparison with A or B type porosity substrates, C porosity substrates are not as chemically homogeneous. This can result in less control over the formation of eta phase at the coating substrate interface (a hard and brittle phase affecting toughness), a reduction in coating adherency and an increase in nonuniform coating growth.

By way of definition, the porosity observed in cemented carbides may be classified into one of three categories recommended by the ASTM (American Society for Testing and Materials) as follows:

Type A for pore sizes less than 10 microns in diameter.

Type B for pore sizes between 10 microns and 40 microns in diameter.

Type C for irregular pores caused by the presence of carbon inclusions. These inclusions are pulled out of the sample during metallographic preparation leaving the aforementioned irregular pores.

In addition to the above classifications, the porosity observed can be assigned a number ranging for 1 through 6 to indicate the degree of frequency of porosity observed. The method of making these classifications can be found in Cemented Carbides by Dr. P. Schwarzkopf and Dr. R. Kieffer, published by the MacMillan Co., New York, (1960) at Pages 116 to 120.

Cemented carbides may also be classified according to their binder carbon and tungsten contents. Tungsten carbide-cobalt alloys having excess carbon are characterized by C porosity which, as already mentioned, are actual free carbon inclusions. Tungsten carbide-cobalt alloys low in carbon and in which the cobalt is saturated with tungsten are characterized by the presence of eta phase, a $M_{12}C$ or $M_6C$ carbide, where M represents cobalt and tungsten. In between the extremes of C porosity and eta phase, there is a region of intermediate binder alloy compositions which contain tungsten and carbon in solution to varying levels, but such that no free carbon or eta phase are present. The tungsten level present in tungsten carbide cobalt alloys can also be characterized by the magnetic saturation of the binder alloy, since the magnetic saturation of the cobalt alloy is a function of its composition. Carbon saturated cobalt is reported to have a magnetic saturation of 158 gauss-$cm^3$/gm cobalt and is indicative of C type porosity, while a magnetic saturation of 125 gauss-$cm^3$/gm cobalt and below indicates the presence of eta phase.

It is, therefore, an object of the present invention to provide a readily controllable and economic process for producing a binder enriched layer near the surface of a cemented carbide body.

It is a further object of this invention to provide a cemented carbide body having a binder enriched layer near its surface with substantially all porosity throughout the body being of the A or B types.

It is also an object of this invention to provide cemented carbide bodies having carbon levels ranging from C porosity to eta phase with a binder enriched layer near their peripheral surface.

It is an additional object of this invention to combine the aforementioned cemented carbide bodies according to the present invention with a refractory coating so as to provide coated cutting inserts having a combination of high wear resistance and high toughness.

These and other objects of the present invention will become more fully apparent upon review of the following description of the invention.

BRIEF SUMMARY OF THE INVENTION

According to the present invention, it has been found that a binder enriched layer can be formed near a peripheral surface of a cemented carbide body through the use of the following process:

Milling and blending a first carbide powder, a binder powder, and a chemical agent powder selected from the group of metals, alloys, hydrides, nitrides and carbonitrides of transition elements [whoe] *whose* carbides have a free energy of formation more negative than that of the first carbide near the binder melting point; and then, sintering or subsequently heat treating a compact of the blended material so as to at least partially transform the chemical agent to its carbide.

In accordance with the present invention, this process may be used to produce a layer of binder enrichment near a peripheral surface of a cemented carbide body, preferably, having substantially only A to B type porosity throughout said body. Enrichment can also be achieved in cemented carbide bodies having carbon levels ranging from eta phase to C porosity.

Cemented carbide bodies in accordance with the present invention have also been found to have a layer beneath said binder enriched layer which is partially binder depleted.

Preferably, the first carbide is tungsten carbide. Preferably, the binder alloy may be cobalt, nickel, iron or their alloys, but is, most preferably, cobalt.

Preferably, the chemical agent is selected from the hydrides, nitrides, and carbonitrides of the Group IVB and VB elements and is, preferably, added in a small but effective amount, most preferably, 0.5 to 2 weight percent of the powder charge. Most preferably, the chemical agent is titanium nitride or titanium carbonitride.

Cemented carbide bodies in accordance with the present invention have also been found to have a layer, at least partially depleted in solid solution carbide, near a peripheral surface of the body. Cemented carbide bodies in accordance with the present invention have also been found to have a layer beneath said depleted solid solution layer which is enriched in solid solution carbides.

The cemented carbide bodies according to the present invention, preferably, have a cutting edge at the juncture of a rake face and a flank face with a hard dense refractory coating adherently bonded to these faces. The binder enriched layer may be ground off the flank face prior to coating.

The refractory coating is preferably composed of one or more layers of a metal oxide, carbide, nitride, boride or carbonitride.

BRIEF DESCRIPTION OF THE DRAWINGS

The exact nature of the present invention will become more clearly apparent upon reference to the following detailed specification, reviewed in conjunction with the accompanying drawings, in which.

DETAILED DESCRIPTION OF THE INVENTION

Figure 1:
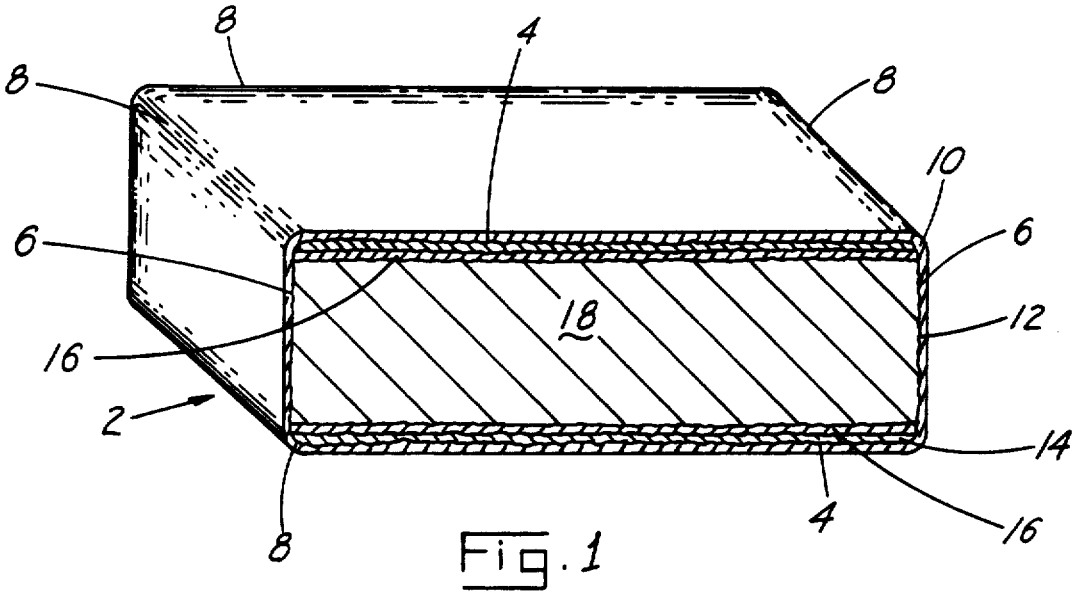
FIG. 1 is a schematic, cross section through an embodiment of a coated metal cutting insert according to the present invention.

The aformentioned objects of the invention are achieved through the heat treatment of a cemented carbide compact containing an element having a carbide with a more negative free energy of formation than that of tungsten carbide at an elevated temperature close to or above the binder melting point. For cutting insert applications, this element or chemical agent can be selected from Group IVB and VB transition metals, their alloys, nitrides, carbonitrides and hydrides. It has been found that the layer of material adjacent to the periphery of cemented tungsten carbide body can be consistently binder enriched and, usually, at least partially solid solution carbide depleted during sintering or reheating at a temperature above the melting point of the binder alloy by incorporating Group IVB and VB nitride, hydride and/or carbonitride additions to the powder charge.

During sintering, these Group IVB and VB additions react with carbon to form a carbide or carbonitride. These carbides or carbonitrides may be present partially or wholly in a solid solution with tungsten carbide and any other carbides present. The level of nitrogen present in the final sintered carbide is typically reduced from the level of nitrogen added as a nitride or carbonitride since these additions are unstable at elevated temperatures above and below the binder alloy melting point and will lead to at least partial volatization of nitrogen from the sample if the sintering atmosphere contains a concentration of nitrogen less than its equilibrium vapor pressure. If the chemical agent is added as a metal, alloy or hydride, it will also be transformed to a cubic carbide, typically in solid solution with the tungsten carbide and any other carbides present. The hydrogen in any hydride added is volatilized during sintering.

The metals, hydrides, nitrides and carbonitrides of tantalum, titanium, niobium, hafnium can be used alone or in combination to promote consistent cobalt enrichment via sintering or subsequent heat treating of tungsten carbide-cobalt base alloys having a wide range of carbon. Additions totaling up to approximately 15 weight percent have been found to be useful. It is believed that the metals, nitrides, carbonitrides and hydrides of zirconium and vanadium are also suitable for this purpose. In A and B porosity alloys and carbon deficient alloys containing eta phase, cobalt enrichment occurs without peripheral cobalt or carbon capping, thus eliminating the need to remove excess cobalt and carbon from the cemented carbide surfaces prior to refractory coating.

Additions of approximately 0.5 to 2 weight percent, especially of titanium in the form of titanium nitride or titanium carbonitride, to tungsten carbide-cobalt base alloys are preferred. Since titanium nitride is not completely stable during vacuum sintering, causing at least partial volatilization of the nitrogen, it is preferable to add one-half mole of carbon per mole of starting nitrogen to maintain the carbon level necessary for a tungsten lean cobalt binder alloy. It has been found that cobalt enrichment via heat treating of tungsten carbide-cobalt base alloys occurs more readily when the alloy contains a tungsten lean cobalt binder. The tungsten lean cobalt binder preferably should have a 145 to 157 gauss-cm$^3$/gm cobalt magnetic saturation. Titanium nitride additions along with the necessary carbon additions to tungsten carbide-cobalt base powder mixes promote the formation of a 145 to 157 magnetic saturation cobalt binder alloy which is ordinarily difficult to achieve. Although a cobalt binder alloy having 145 to 157 gauss-cm$^3$/gm cobalt magnetic saturation is preferred, alloys containing tungsten saturated cobalt binder alloys (less than 125 gauss-cm$^3$/gm cobalt) can also be enriched. *Furthermore, a cobalt binder alloy having a magnetic saturation value of less than 158 gauss-cm$^3$/gm cobalt and at least 139 gauss-cm$^3$/gm cobalt is another preferred range within the scope of the invention. As previously mentioned, carbon saturated cobalt, i.e. a C porosity substrate, has a magnetic saturation value of about 158 gauss-cm$^3$/gm cobalt. Example 14 herein reports a tungsten content in the W-Co binder alloy of 10 weight percent. Such a W-Co binder alloy has a magnetic saturation value of about 139 gauss-cm$^3$/gm cobalt based on data presented in the 1973 article by Tillwick, D. C. and Joffe, I., "Magnetic Properties of Co-W Alloys in Relation to Sintered WC-Co Compacts", Scripta Metallurgia, Vol. 7, pp. 479–484 (1973).*

It has been found that a layer of cobalt enrichment thicker than six microns results in a significant improvement in the edge strength of refractory coated cemented carbide inserts. While cobalt enrichment as deep as 125 microns has been achieved, a cobalt enriched layer having a thickness of 12 to 50 microns is preferred for coated cutting insert applications. It is also preferable that the cobalt content of the cobalt enriched layer on a refractory coated insert be between 150 to 300 percent of the mean cobalt content as measured on the surface by energy dispersive x-ray analysis. *Furthermore, the ranges of binder or cobalt enrichment in the enriched layer preferably includes a content that reaches between about 175 percent to about 300 percent of the average binder or cobalt content of the cemented carbide body. The ranges of binder or cobalt enrichment in the enriched layer also includes a binder or cobalt content that preferably reaches between about 200 percent and about 300 percent of the average cobalt content of the cemented carbide body.*

[it] *It* is believed that binder enrichment should occur in all tungsten carbide-binder-cubic carbide (i.e., tantalum, niobium, titanium, vanadium, hafnium, zirconium) alloys which do not sinter to a [coninuous] *continuous* carbide skeleton. These alloys containing binder from 3 weight percent and above should enrich utilizing the disclosed process. However, for cutting insert applications, it is preferred that the binder content be between 5 and 10 weight percent cobalt and that the total cubic carbide content be 20 weight percent or less. While cobalt is the preferred binder, nickel, iron and their alloys with one another, as well as with cobalt, may be substituted for cobalt. Other binder alloys containing nickel or cobalt or iron should also be suitable.

The sintering and heat treating temperatures used to obtain binder enrichment are the typical liquid phase sintering temperatures. For cobalt base alloys, these temperatures are 1285 to 1540 degrees Centigrade. Sintering cycles should be at least 15 minutes at temperature. Results can be further optimized by the use of controlled cooling rates from the heat treating temperatures down to a temperature below the binder alloy melting point. These cool down rates should be between 25 to 85 degrees Centrigrade/hour, preferably 40 to 70 degrees Centrigrade/hour. Most preferably, the heat treat cycle for cutting insert substrates having a cobalt binder is 1370 to 1500 degrees Centrigrade for 30 to 150 minutes, followed by a 40 to 70 degrees Centigrade/hour cool down to 1200 degrees Centigrade. Pressure levels during heat treating can vary from $10^{-3}$ torr up to and including those elevated pressures typically used in hot isostatic pressing. The preferred pressure level is 0.1 to 0.15 torr. If nitride or carbonitride additions are being utilized, the vapor pressure of the nitrogen in the sintering atmosphere is preferably below its equilibrium pressure, so as to allow volatilization of nitrogen from the substrate.

While initial enrichment will occur upon sintering, subsequent grinding steps in the metal cutting insert fabrication process may remove the enriched zones. In these situations, a subsequent heat treatment in accordance with the above parameters can be utilized to develop a new enriched layer beneath the peripheral surfaces.

Binder enriched substrates to be used in coated cutting inserts can have binder enrichment on both the rake and flank faces. However, depending on insert style, the binder enrichment on the flank face may sometimes be removed, but this is not necessary to achieve optimum performance in all cases.

The binder enriched substrates can be coated using the refractory coating techniques well known to those skilled in the art. While the refractory coating applied can have one or more layers comprising materials selected from the Group IVB and VB carbides, nitrides, borides, and carbonitrides, and the oxide of the oxynitride of aluminum, it has been found that a combination of good cutting edge strength and flank wear can be achieved by combining a substrate having a binder enriched layer according to the [prsent] *present* invention with a coating of: aluminum oxide over an inner layer of titanium carbide; or an inner layer of titanium carbide bonded to an intermediate layer of titanium carbontride, which is bonded to an outer layer of titanium nitride, or titanium nitride bonded to an inner layer of titanium carbide. A cemented carbide body having a binder enriched layer according to the present invention in combination with a titanium carbide/aluminum oxide coating is most preferred. In this case, the coating should have a total coating thickness of 5 to 8 microns.

Referring now to FIG. 1, an embodiment of a coated metalcutting insert 2 according to the present invention is schematically shown. The insert 2 is comprised of a substrate or cemented carbide body 12 having a binder enriched layer 14, and a binder depleted layer 16 over the bulk 18 of the substrate 12 which has a chemistry substantially equal to the chemistry of the original powder blend.

A binder enriched layer 14 is present on the rake faces 4 of the cemented carbide body and has been ground off the flank faces 6 of the body. Located inwardly of the binder enriched layer 14 may be a binder depleted zone 16. This binder depleted zone 16 has been found to develop along with the binder enriched layer when cemented carbide bodies are fabricated according to the disclosed process.

The binder depleted zone 16 is partially depleted in binder material while being enriched in solid solution carbides. The enriched layer 14 is partially depleted in solid solution carbides. Inwardly of the binder depleted zone 16 is bulk substrate material 18.

At the junction of the rake faces and flank faces 6, a cutting edge 8 is formed. While the cutting edge 8 shown here is honed, honing of the cutting edge is not necessary for all applications of the present invention. It can be seen in FIG. 1 that the binder enriched layer 14 extends into this cutting edge area and is, preferably, adjacent to most, if not all, of the honed edge 8. The binder depleted zone 16 extends to the flank surface 6 just below the cutting edges 8. A refractory coating 10 has been adherently bonded to the peripheral surface of the cemented carbide body 12.

These and other features of the invention will become more apparent upon reviewing the following examples.

EXAMPLE NO. 1

A mix containing 7000 grams of powders was milled and blended for 16 hours with a paraffin, a surfactant, a solvent and cobalt bonded tungsten carbide cycloids, in the amounts and proportions shown below

| | | |
|---|---|---|
| 10.3 w/o* | Ta(C) | 7000 gm |
| 5.85 w/o* | Ti(C) | |
| 0.2 w/o* | Nb(C) | |
| 8.5 w/o | Co | |
| 1.5 w/o* | Ti(N) [−] = 102.6 grams [WC] *WC* + C to produce a 2 w/o W − 98 w/o Co binder alloy | |
| 2 w/o | paraffin (Sunoco 3420) (Sun Oil Co.) | |
| 2.5 liter | solvent (perchloroethylene) | |
| 14 gram | surfactant (Ethomeen S-15) (Armour Industrial Chemcial Co.) | |

*weight percent of metal added.

Square insert blanks having dimensions of 15.1 mm × 15.1 mm × 5.8 mm and a weight of 11.6 grams were pill pressed using a force of 8200 kilograms.

These inserts were vacuum sintered at 1496 degrees Centigrade for 30 minutes, and then cooled under ambient furnace conditions. After sintering, the inserts weighted 11.25 grams and were 13.26 mm×13.26 mm×4.95 mm in size. These inserts were then processed to SNG433 ground dimensions as follows: (this identification number is based on the insert identification system developed by the American Standards Association and which has been generally adopted by the cutting tool industry. The International designation is: SNGN 12 04 12)

1. Tops and bottoms (rake faces) of the inserts were ground to a thickness of 4.75 mm.
2. The inserts were heat treated at 1427 degrees Centigrade for 60 minutes under a 100 micron vacuum, then cooled at a rate of 56 degrees Centigrade/-hour to 1204 degrees Centigrade, followed by cooling under ambient furnace conditions.
3. The periphery (flank faces) were ground to produce a 12.70 mm square and the cutting edges honed to a 0.064 mm radius.

A titanium carbide/titanium carbonitride/titanium nitride coating was then applied to the ground inserts using the following chemical vapor deposition (CVD) techniques in the following order of application:

TABLE I

| | Coating Type | Coating Temperature | Coating Pressure | Coating Pressure |
|---|---|---|---|---|
| 1. | TiC | 982–1025° C. | ~1 atm. | $TiCl_4 + CH_4 \overset{H_2}{\rightleftharpoons} TiC_{(s)} + 4\ HCl$ |
| 2. | TiCN | 982–1025° C. | ~1 atm. | $TiCl_4 + CH_4 + \frac{1}{2} N_2 \overset{H_2}{\rightleftharpoons} TiCN_{(s)} + 4\ HCl$ |
| 3. | TiN | 982–1050° C. | ~1 atm. | $TiCl_4 + 2\ H_2 + \frac{1}{2} N_2 \longrightarrow TiN_{(s)} + 4\ HCl$ |

Processed along with the above inserts were inserts made from the same powder blend but without the TiN and its attendent carbon addition. Microstructural data obtained from the coated inserts are shown below:

| | EXAMPLE 1 without TiN | EXAMPLE 1 with TiN |
|---|---|---|
| Porosity | A1 | A1, B2 (non-enriched, bulk) A1 (enriched) |
| Cobalt Enriched Zone Thickness | None | ~22.9 microns (rake face only) |
| Solid Solution Depleted Zone Thickness | None | ~22.9 microns) (rake face only) |
| TiC/Substrate Interface Eta Phase Thickness | 4.6 microns | 3.3 microns |
| Coating Thickness | | |
| TiC | 5.6 microns | 5.0 microns |
| TiCN | 2.3 microns | 3.9 microns |
| TiN | 1.0 microns | 1.0 microns |

EXAMPLE NO. 2

Green pill pressed inserts were fabricated according to Example 1 utilizing the Example 1 blends with and without the TiN and its attendent carbon additions. These inserts were sintered at 1496 degrees Centigrade for 30 minutes under a 25 micron vacuum and then cooled under ambient furnace conditions. They were then honed (0.064 mm radius), and subsequently TiC/-TiCN/TiN CVD coating according to the techniques shown in Table I. In this example, it should be noted that the cobalt enriched layer was present on both flank and rake faces.

The coated inserts were subsequently evaluated and the following results were obtained:

| | EXAMPLE 2 without TiN | EXAMPLE 2 with TiN |
|---|---|---|
| Porosity | A-1 edges | A-2 enriched zone |
| | A-3 center | A-4 bulk |
| Cobalt Enriched Zone Thickness | None | up to 22.9 microns |
| Solid Solution Depleted Zone Thickness | None | partial and intermittent up to 21 microns |
| TiC/Substrate Interface Eta Phase Thickness | up to 5.9 microns | 3.3 microns |
| Coating Thickness | | |
| TiC | 2.0 microns | 1.3 microns |
| TiCN | 1.7 microns | 1.0 microns |
| TiN | 8.8 microns | 7.9 microns |
| Average Rockwell "A" Hardness (Bulk Material) | 91.2 | 91.4 |
| Coercive Force, Hc | 138 oersteds | 134 oersteds |

EXAMPLE NO. 3

A mix comprising the following materials was charged into a cylindrical mill, with a surfactant, fugitive binder, solvent and 114 kilograms of cycloids:

| | | |
|---|---|---|
| 85.15 w/o | WC (2-2.5 micron particle size) | 15,000 grams |
| | WC (4-5 micron particle size) | 27,575 grams |
| 5.98 w/o | TaC | 2,990 grams |
| 2.6 w/o | TiN | 1,300 grams |
| 6.04 w/o | Co | 3,020 grams |
| 0.23 w/o | C(Ravin 410-a product of Industrial Carbon Corp.) | 115 grams |
| | | 50,000 grams |

The powder charge was balanced to produce 6.25 weight percent total carbon in the charge. The mix was blended and milled for 90,261 revolutions to obtain an average particle size of 0.90 microns. The blend was then wet screened, dried and hammer milled. Compacts were pressed and then sintered at 1454 degrees Centigrade for 30 minutes followed by cooling under ambient furnace conditions.

This treatment produced a sintered blank having an overall (i.e., measurement included bulk and binder enriched material) magnetic saturation of 117 to 121 gauss-cm$^3$/gm cobalt. Microstructural evaluation of the sintered blank showed: eta phase to be present throughout the blank; porosity to be A-2 to B-3; the cobalt enriched zone thickness to be approximately 26.9 microns; and the solid solution depicted zone thickness to be approximately 31.4 microns.

EXAMPLE NO. 4

The following materials were added to a 190 mm inside diameter by 194 mm long mill jar lined with a tungsten carbide cobalt alloy. In addition, 17.3 kilograms of 3.2 mm tungsten carbide-cobalt cycloids were added to the jar. These materials were milled and blended together by rotating the mill jar about its cylindrical axis at 85 revolutions per minute for 72 hours (i.e., 367,200 revolutions).

| CHARGE COMPOSITION | |
|---|---|
| 283 grams (4.1 wt. %) | TaC |
| 205 grams (3.0 wt. %) | NbC |
| 105 grams (1.5 wt. %) | TiN |
| 7.91 grams (0.1 wt. %) | C |
| 381 grams (5.5 wt. %) | Co |
| 5946 grams (85.8 wt. %) | WC |
| ~105 grams | Sunoco 3420 |
| 14 grams | Ethomeen S-15 |
| 2500 milliliters | Perchloroethylene |

This mix was balanced to produce a 2 w/o W—98 w/o Co binder alloy. After milling and blending, the slurry was wet screened to remove oversized particles and contaminants, dried at 93 degrees Centigrade under a nitrogen atmosphere and then hammer milled to break up agglomerates in a Fitzpatrick Co. J-2 Fitzmill.

Using this powder, compacts were pressed and then sintered at 1454 degrees Centigrade for 30 minutes and cooled under ambient conditions.

The top and bottom (i.e., the rake faces) of the insert were then ground to final thickness. This was followed by a heat treatment at 1427 degrees Centigrade under an 100 micron vacuum. After 60 minutes at temperature, the inserts were cooled at a rate of 56 degrees Centigrade/hour to 1204 degrees Centigrade and then furnace cooled under ambient conditions. The periphery (or flank) surfaces were then ground to a 12.70 mm square and the insert cutting edges honed to a 0.064 mm radius. These treatments resulted in an insert substrate in which only the rake faces had a cobalt enriched and solid solution depleted zone, these zones having been ground off the flank faces.

The inserts were then loaded into a coating reactor and coated with a thin layer of titanium carbide using the following chemical vapor deposition technique. The hot zone containing the inserts was first heated from room temperature to 900 degrees Centigrade. During this heating period, hydrogen gas was allowed to flow through the reactor at a rate of 11.55 liters per minute. The pressure within the reactor was maintained at slightly less than one atmosphere. The hot zone was then heated from 900 degrees Centigrade to 982 degrees Centigrade. During this second heat up stage, the reactor pressure was maintained at 180 torr. and a mixture of titanium tetrachloride and hydrogen, and pure hydrogen gas entered the reactor at flow rates of 15 liters per minute and 33 liters per minute, respectively. The mixtures of titanium tetrachloride and hydrogen gas was achieved by passing the hydrogen gas through a vaporizer holding the titanium tetrachloride at a temperature of 47 degrees Centigrade. Upon attaining 982 degrees Centigrade, methane was then allowed to also enter the reactor at a rate of 2.5 liters per minute. The pressure within the reactor was reduced to 140 torr. Under these conditions, the titanium tetrachloride reacts with the methane in the presence of hydrogen to produce titanium carbide on the hot insert surface. These conditions were maintained for 75 minutes, after which the flow of titanium tetrachloride, hydrogen and methane was terminated. The reactor was then allowed to cool while Argon was being passed through the reactor at a flow rate of 1.53 liters per minute under slightly less than one atmosphere pressure.

Examination of the microstructure in the final insert revealed a cobalt enriched zone extending inwardly up to 22.9 microns and a cubic carbide solid solution depletion zone extending inwardly up to 19.7 microns from the substrate rake surfaces. The porosity in the enriched zone and the remainder of the substrate was estimated to be between A-1 and A-2.

EXAMPLE NO. 5

The material in this example was blended and milled using a two stage milling process with the following material charges:

| | |
|---|---|
| Stage I (489,600 revolutions) | |
| 141.6 grams (2.0 wt. %) | TaH |
| 136.4 grams (1.9 wt. %) | TiN |
| 220.9 grams (3.1 wt. %) | NbC |
| 134.3 grams (1.9 wt. %) | TaC |
| 422.6 grams (5.9 wt. %) | Co |
| 31.2 grams (0.4 wt. %) | C |
| 14 grams | Ethomeen S-15 |
| 1500 milliliters | Perchloroethylene |
| Stage II (81,600 revolutions) | |
| 6098 grams (84.9 wt. %) | WC |
| 140 grams | Sunoco 3420 |
| 1000 milliliters | Perchloroethylene |

This was balanced to produce a 2 w/o W—98 w/o Co binder alloy.

The test inserts were then fabricated and TiC coated in accordance and along with the test blanks described in Example No. 4.

Microstructural evaluation of the coated inserts revealed the porosity in the cobalt enriched as well as the bulk material to be A-1. The cobalt enriched zone and the solid solution depleted zone extended inward from the rake surface to depths of approximately 32.1 microns and 36 microns, respectively.

EXAMPLE NO. 6

The following materials were charged into a 190 mm inside diameter mill jar:

| | |
|---|---|
| 283 grams (4.1 w/o) | TaC |
| 205 grams (3.0 w/o) | NbC |
| 105 grams (1.5 w/o) | TiN |
| 7.91 grams (0.1 w/o) | C |
| 381 grams (5.5 w/o) | Co |
| 5946 grams (85.8 w/o) | WC |
| 140 grams | Sunoco 3420 |
| 14 grams | Ethomeen S-15 |
| 2500 milliliters | Perchloroethylene |

This mix was balanced to produce a 2 w/o W—98 w/o Co binder alloy.

In addition, cycloids were added to the mill. The mixture was then milled for four days. The mix was dried in a sigma blender at 121 degrees Centigrade under a partial vacuum, after which it was Fitzmilled through a 40 mesh sieve.

SNG433 inserts were then fabricated using the techniques described in Example 4. The inserts in this Example, however, were CVD coated with a TiC/TIN coating. The coating procedure used was as follows:

1. TiC coating—The samples in the coating reactor were held at approximately 1026 to 1036 degrees Centigrade under a 125 torr vacuum. Hydrogen carrier gas flowed into a $TiCl_4$ vaporizer at a rate of 44.73 liters/minute. The vaporizer was held at 33 to 35 degrees Centigrade under vacuum. $TiCl_4$ vapor was entrained in the $H_2$ carrier gas and carried into the coating reactor. Free hydrogen and free Methane flowed into the coating reactor at 19.88 and 3.98 liters/minute, respectively. These conditions were maintained for 100 minutes and produced a dense TiC coating adherently bonded to the substrate.

2. TiN coating—Methane flow into the reactor was discontinued and $N_2$ was allowed into the reactor at a rate of 2.98 liters/minute. These conditions were maintained for 30 minutes and produced a dense TiN coating adherently bonded to the TiC coating.

Evaluation of the Coated inserts produced the following results:

| | |
|---|---|
| Porosity | A-1, throughout |
| Cobalt Enriched Zone Thickness | 17.0 to 37.9 microns |
| Solid Solution Depleted Zone Thickness | up to 32.7 microns |
| TiC/Substrate Interface Eta Phase Thickness | up to 3.9 microns |
| Coating Thickness | |
| TiC | 3.9 microns |
| TiN | 2.6 microns |
| Average Rockwell "A" Hardness of Bulk | 91.0 |

-continued

| | |
|---|---|
| Coercive Force, Hc | 98 oersteds |

EXAMPLE NO. 7

A blend of material was made using the following two stage milling cycle:

In Stage I, the following materials were added to a 181 mm inside diameter by 194 mm long WC-Co lined mill jar with 17.3 kg of 4.8 mm WC-Co cycloids. The mill jar was rotated about its cylindrical axis at 85 revolutions per minute for 48 hours (244,800 revolutions).

| | |
|---|---|
| 140.8 grams (2.0 wt. %) | Ta |
| 72.9 grams (1.0 wt. %) | TiH |
| 23.52 grams (0.3 wt. %) | C |
| 458.0 grams (6.5 wt. %) | Co |
| 30 grams | Ethomeen S-15 |
| 120 grams | Sunoco 3420 |
| 1000 milliliters | Soltrol 130 (a solvent) |

In Stage II, 6314 grams (90.2 wt. %) WC and 1500 ml Soltrol 130 were added and the entire charge rotated an additional 16 hours (81,600) revolutions. This mix was balanced to produce a 5 w/o W—95 w/o Co binder alloy. After milling, the slurry was wet screened through 400 mesh, dried under nitrogen at 93 degrees Centigrade for 24 hours and Fitzmilled through a 40 mesh screen.

Test samples were uniaxially pressed at 16,400 kilograms total force to 15.11 mm×15.11 mm×5.28 mm (8.6 gram/cc specific gravity).

The above green test samples were sintered at 1468 degrees Centigrade for 150 minutes under a 1 micron vacuum. The inserts was then cooled under ambient furnace conditions. Flake graphite was used as the parting agent between the test inserts and the graphite sintering trays.

The as sintered inserts were honed to a 0.064 mm radius. The inserts were then coated with a TiC/TiCN/TiN coating according to the following procedure:

1. Inserts were located into the reactor and air purged out of the reactor by flowing hydrogen through it.

2. Inserts were heated to approximately 1038 degrees Centigrade while maintaining hydrogen flow through the reactor. Coating reactor pressure was held at slightly greater than one atmosphere.

3. TiC coating—For 25 minutes, a mixture of $H_2+TiCl_4$ entered the reactor at a rate of approximately 92 liters/minute and methane entered the reactor at a rate of 3.1 liters/minute. The $TiCl_4$ vaporizer was maintained at approximately 6 psi and 30 degrees Centigrade.

4. TiCN coating—For 13 minutes, the flow of the $H_2+TiCl_4$ mixture was substantially maintained; the flow of methane reduced by one-half; and $N_2$ was introduced into the reactor at a rate of 7.13 liters/minute.

5. TiN coating—For 12 minutes, the methane flow was discontinued and the nitrogen flow rate doubled. Upon completion of TiN coating, both the flow of the $H_2+TiCl_4$ mixture and the $N_2$ were discontinued, the reactor heating elements shut off and the reactor purged with free $H_2$ until it cooled to approximately 250 degrees Centigrade. At 250 degrees Centigrade, the reactor was purged with nitrogen.

It was determined that the insert substrates had an A-1 to A-2 porosity in their nonenriched interior or bulk material. A cobalt enriched zone and solid solution depleted zone extended in from the surfaces approximately 25 microns and 23 microns, respectively. The nonenriched interior had an average hardness of 91.7 Rockwell "A". The coercive force, Hc, of the substrate was found to be 186 oersteds.

EXAMPLE NO. 8

A 260 kg blend of powder, having carbon balanced to C3/C4 porosity in the final substrate, was fabricated using the following two stage blending and milling procedure:

STAGE I

The following charge composition was milled for 96 hours:

| | |
|---|---|
| 10,108 grams | TaC (6.08 w/o Carbon) |
| 7,321 grams | NbC (11.28 w/o Carbon) |
| 3,987 grams | TiN |
| 1,100 grams | C (Molocco Black-a product of Industrial Carbon Corp.) |
| 16,358 grams | Co |
| 500 grams | Ethomeen S-15 |
| 364 kilograms | 4.8 mm Co—WC cycloids Naphtha |

STAGE II

The following was added to the above blend, and the mixture milled for an additional 12 hours:

221.75 kilograms: WC (6.06 w/o Carbon)

5.0 kilograms: Sunoco 3420 Naphtha

The final blend was then wet screened, dried, and Fitzmilled.

Insert blanks were then pressed and later sintered at 1454 degrees Centigrade for 30 minutes. This sintering procedure produce a cobalt enriched zone overlying bulk material having a C3/C4 porosity. The sintered blanks were then ground and honed to SNG433 insert dimensions, resulting in removal of the cobalt enriched zone.

The sintered inserts were then packed with flake graphite inside of an open graphite canister. This assembly was then hot isostatically pressed (HIPed) at 1371 to 1377 degrees Centigrade for one hour under a $8.76\times10^8$ dynes/cm$^2$ atmosphere of 25 v/o $N_2$ and 75 v/o He. Microstructural examination of a HIPed sample revealed that a cobalt enriched zone of approximately 19.7 microns in depth had been produced during HIPing. About 4 microns of surface cobalt and $2\mu$ surface of carbon were also produced due to the C type porosity substrate utilized.

EXAMPLE NO. 9

A batch containing the following materials was ball milled:

| | | |
|---|---|---|
| 30. w/o | WC (1.97 micron average particle size) | 750 kg |
| 51.4. w/o | WC (4.43 micron average particle size) | 1286 kg |
| 6.0 w/o | Co | 150 kg |
| 5.0 w/o | WC—TiC solid solution carbide | 124.5 kg |
| 6.1 w/o | Ta—Wc solid solution carbide | 152 kg |
| 1.5 w/o | W | 37.5 kg |

This mix was charged to 6.00 w/o total carbon. These materials were milled for 51,080 revolutions with 3409 kilograms of cycloids and 798 liters of naphtha. A final particle size of 0.82 microns was produced.

Five thousand grams of powder were split from the blended and milled batch and the following materials added to it:

| | | |
|---|---|---|
| 1.9 w/o | TiN (premilled to approximately 1.4 to 1.7 microns) | 96.9 gm |
| 0.2 w/o | C (Ravin 410) | 9.4 gm |
| 1500 ml | Perchloroethylene | |

These materials were then milled in a 190 mm inside diameter tungsten carbide lined mill jar containing 50 volume percent cycloids (17.3 kg) for 16 hours. Upon completion of milling, the lot was wet screened through a 400 mesh screen, dried under partial vacuum in a sigma blender at 121 degrees Centigrade, and then Fitzmilled through a 40 mesh sieve.

SNG433 blanks were pressed using a force of 3600 kilograms to produce a blank density of 8.24 gm/cc and a blank height of 5.84 to 6.10 mm.

The blanks were sintered at 1454 degrees Centigrade for 30 minutes on a NbC powder parting agent under a 10 to 25 micron vacuum and then allowed to furnace cool. The sintered samples had sintered dimensions of 4.93 mm$\times$13.31 mm square, a density of 13.4 gm/cc and an overall magnetic saturation value of 146 to 150 gauss-cm$^3$/gm Co. Microstructural evaluation of the samples showed A porosity throughout and a cobalt enriched layer approximately 21 microns thick.

The top and bottom of the inserts were then ground to a total thickness of 4.75 mm. The inserts were then heat treated at 1427 degrees Centigrade for 60 minutes under a 100 micron vacuum cooled to 1204 degrees Centigrade at a rate of 56 degrees Centigrade/hour and then furnace cooled.

The flank faces of each insert were ground to a 12.70 mm square and the edges honed to a 0.064 mm radius.

The inserts were subsequently CVD coated with titanium carbide/aluminum oxide using the following techniques.

The inserts were placed in a coating reactor and heated to approximately 1026 to 1030 degrees Centigrade and held under an 88 to 125 torr vacuum. Hydrogen gas at a rate of 44.73 liters/minute was passed through a vaporizer containing $TiCl_4$ at 35 to 38 degrees Centigrade under vacuum. $TiCl_4$ vapor was entrained in the hydrogen and directed into the coating reactor. Simultaneously, hydrogen and methane were flowing into the reactor at rates of 19.88 and 2.98 liters/minute. These conditions of [vacuu] *vacuum*, temperature, and flow rate were maintained for 180 minutes producing an adherent TiC coating on the inserts. Hydrogen flow to the vaporizer and methane flow into the reactor were then terminated. Hydrogen and chlorine were now allowed to flow to a generator containing aluminum particles at 380 to 400 degrees Centigrade and 0.5 psi pressure. The hydrogen and chlorine flowed into the generator at rates of 19.88 liters/minute and 0.8 to 1.0 liter/minute, respectively. The chlorine reacted with the aluminum to produce $AlCl_3$ vapors which were then directed into the reactor. While the hydrogen and $AlCl_3$ were flowing into the reactor, $CO_2$ at a rate of 0.5 liters/minute was also flowing into the reactor. These flow rates were maintained for 180 minutes during which time the inserts were held at 1026 to 1028 degrees Centigrade under a vacuum of approximately 88 torr. This procedure produced a dense coating of $Al_2O_3$ adherently bonded to a TiC inner coating.

Evaluation of the coated inserts produced the following results:

| | |
|---|---|
| Porosity | A1 in enriched zone, A1 with scattered B in the bulk material |
| Cobalt Enriched Zone Thickness (rake surface) | approximately 39.3 microns |
| Solid Solution Depleted Zone Thickness (rake surface) | up to 43.2 microns |
| Coating Thickness | |
| TiC | 5.9 microns |
| $Al_2O_3$ | 2.0 microns |
| Average Bulk Substrate Rockwell A Hardness | 91.9 |
| Coercive Force, Hc | 170 oersteds |

EXAMPLE NO. 10

An additional 5000 grams of material were split from the initial batch of material produced in Example 9. Premilled TiCN in the amount of 95.4 grams (1.9 w/o) and 1.98 grams (0.02 w/o) Ravin 410 carbon black were added to this material, mixed for 16 hours, screened, dried, and Fitzmilled, as per Example 9.

Test pieces were pill pressed, vacuum sintered at 1496 degrees Centigrade for 30 minutes, and then furnace cooled at the ambient furnace cooling rate. Evaluation of the sintered samples produced the following results:

| | |
|---|---|
| Porosity | A-1, throughout |
| Cobalt Enriched Zone Thickness | approximately 14.8 microns |
| Solid Solution Depleted Zone Thickness | up to 19.7 microns |
| Average Bulk Substrate Rockwell A Hardness | 92.4 |
| Magnetic Saturation | 130 gauss-cm$^3$/gm Co |
| Coercive Force, (Hc) | 230 oersteds |

EXAMPLE NO. 11

An additional 5000 grams of material were split from the initial batch made in Example 9. Premilled TiCN in the amount of 95.4 grams (1.9 w/o) was added, mixed for 16 hours, screened, dried and Fitzmilled as per Example 9. Test pieces were then pressed and sintered at 1496 degrees Centigrade with the Example 10 test pieces.

Evaluation of the sintered samples produced the following results:

| | |
|---|---|
| Porosity | A-1, with heavy eta phase throughout |
| Cobalt Enriched Zone Thickness | approximately 12.5 microns |
| Solid Solution Depleted Zone Thickness | up to 16.4 microns |
| Average Bulk Rockwell A Hardness | 92.7 |
| Magnetic Saturation | 120 gauss-cm$^3$/gm Co |
| Coercive Force, Hc | 260 oersteds |

EXAMPLE NO. 12

The following mix was charged using the two stage milling cycle outlined below:

STAGE I

The following materials were added to a 181 mm inside diameter by 194 mm long WC-Co lined mill jar with 17.3 kg of 4.8 mm WC-Co cycloids. The mill jar was rotated about its cylindrical axis at 85 revolutions per minute for 48 hours (244,800 revolutions).

| | |
|---|---|
| 455 grams (6.5 wt. %) | Ni |
| 280 grams (4.0 wt. %) | TaN |
| 112 grams (1.6 wt. %) | TiN |
| 266 grams (3.8 wt. %) | NbN |
| 42.7 grams (0.6 wt. %) | Carbon |
| 14.0 grams | Ethomeen S-15 |
| 1500 milliliters | Perchloroethylene |

The following were then added to the mill jar and rotated an additional 16 hours (81,600 revolutions):

| | |
|---|---|
| 5890 grams (83.6 wt. %) | WC |
| 105 grams | Sunoco 3420 |
| 1000 milliliters | Perchloroethylene |

This mix was balanced to produce a 10 w/o *W*-90 w/o Ni binder alloy. After discharging the mix slurry from the mill jar, it was wet screened through a 400 mesh sieve (Tyler), dried at 93 degrees Centigrade under an nitrogen atmosphere, and Fitzmilled through a 40 mesh sieve.

Test samples were pill pressed, sintered at 1450 Centigrade for 30 minutes under a $6.9\times10^4$ dynes/cm$^2$ nitrogen atmosphere, and then furnace cooled at the ambient furnace cooling rate. Following sintering, the samples were HIPed at 1370 degrees Centigrade for 60 minutes in a $1\times10^9$ dynes/cm$^2$ helium atmosphere. Optical metallographic evaluation of the HIPed samples showed the material to have A-3 porosity throughout and a solid solution depletion zone thickness of approximately 25.8 microns.

Figure 3:
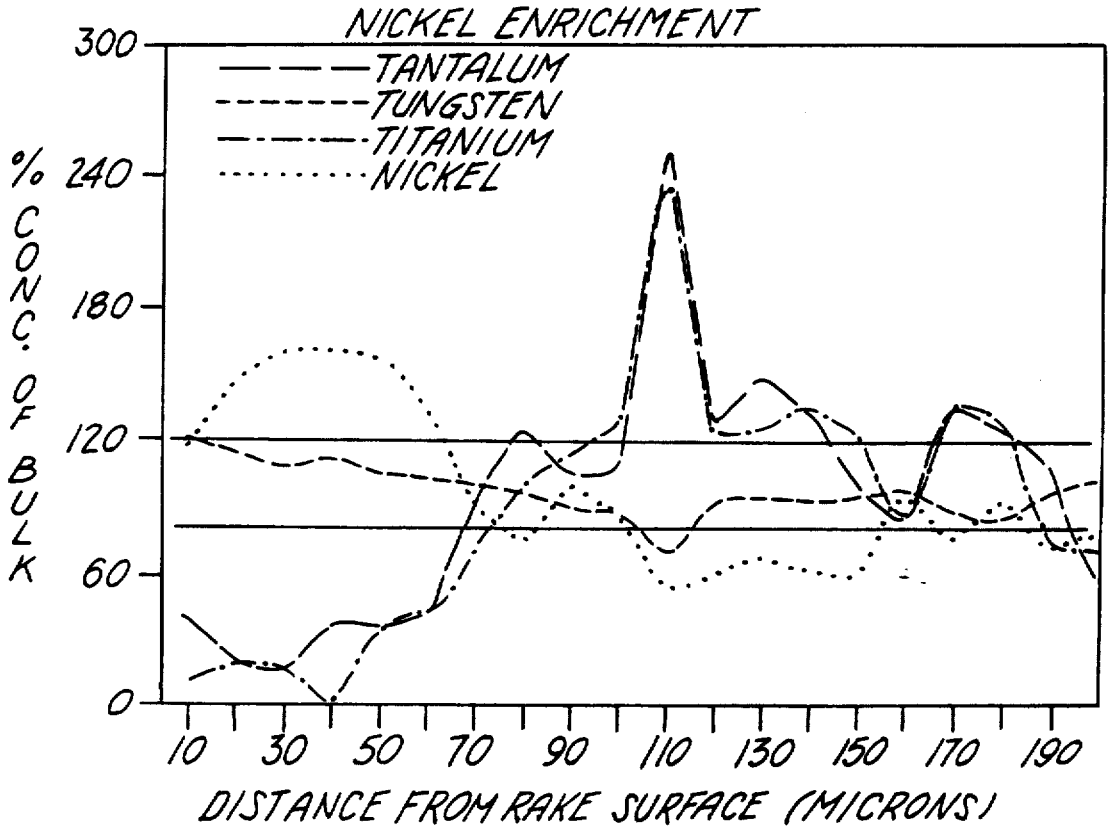
FIG. 3 is a graphical representation of the variation in binder and solid solution carbides relative concentrations as a function of depth below the rake surface in an Example 12 sample.

Subsequently, the sample was reprepared and examined by energy dispersive x-ray line scan analysis (EDX) at various distances from the rake surface. FIG. 3 shows a graphical representation of the variation of nickel, tungsten, titanium and tantalum relative concentrations as a function of distance from the rake surface of the sample. It can be clearly seen that there is a layer near the surface in which the titanium and tantalum, forming carbides which are in solid solution with tungsten carbide, are at least partially depleted. This solid solution depleted zone extends inwardly approximately 70 microns. The discrepancy between this value and the value reported above are believed to be due to the fact that the sample was reprepared between evaluations so that different planes through the sample were examined in each evaluation.

Corresponding with the titanium and tantalum depletion is an enriched layer of nickel (see FIG. 3). The nickel concentration in the enriched layer decreases as the distance from the rake surface decreases from 30 to 10 microns. This indicates that the nickel in this zone was partially volatilized during vacuum sintering.

The spike in titanium and tantalum concentration at 110 microns is believed to be due to the scanning of a random large grain or grains having a high concentration of these elements.

The two parallel horizontal lines show the typical scatter obtained in analysis of the bulk portion of the sample around the nominal blend chemistry.

EXAMPLE NO. 13

The following mix was charged using the two stage milling cycle outlined below:

STAGE I

The following materials were milled per Stage I of Example 12:

| | |
|---|---|
| 455 grams (6.4 w/o) | Ni |
| 280 grams (3.9 w/o) | TaH |
| 112 grams (1.6 w/o) | TiN |
| 266 grams (3.7 w/o) | NbN |
| 61.6 grams (0.9 w/o) | C Ravin 410, 502 |
| 14 grams | Ethomeen S-15 |
| 2500 milliliters | Perchloroethylene |

STAGE II

The following were then added to the mill jar and rotated an additional 16 hours:

| | |
|---|---|
| 5980 grams (83.6 w/o) | WC |
| 140 grams | Sunoco 3420 |

This mix was balanced to produce 10 w/o W—90 w/o Ni binder alloy.

After discharging the mix, it was screened, dried and Fitzmilled per Example 12.

Pressed test samples were vacuum sintered at 1466 degrees Centigrade for 30 minutes under a 35 micron atmosphere. The sintered samples had an A-3 porosity throughout and a solid solution depletion zone up to 13.1 microns thick.

EXAMPLE NO. 14

A mix was charged using the following two stage milling cycle:

STAGE I

The following materials were added to a 190 mm inside diameter by 194 mm long WC-Co lined mill jar with 17.3 kg of 4.8 mm WC-Co cycloids. The mill jar was rotated about its axis at 85 revolutions per minute for 48 hours (244,800 revolutions):

| | |
|---|---|
| 177 grams (2.5 wt. %) | $HfH_2$ |
| 182.3 grams (2.5 wt. %) | $TiH_2$ |
| 55.3 grams (0.8 wt. %) | Carbon |
| 459 grams (6.4 wt. %) | Co |
| 14 grams | Ethomeen S-15 |
| 2500 milliliters | Perchloroethylene |

STAGE II

The following was then added to the mill jar and rotated an additional 16 hours (81,600 revolutions):

| | |
|---|---|
| 6328 grams (87.9 wt. %) | WC |
| 140 grams | Sunoco 3420 |

This mix was balanced to produce 10 w/o W—90 w/o Co binder alloy.

After discharging the slurry from the mill jar, it was wet screened through 400 mesh, dried at 93 degrees Centigrade under a nitrogen atmosphere, and Fitzmilled through a 40 mesh screen.

Insert blanks were pressed and then sintered at 1468 Centigrade for 30 minutes under a 35 micron vacuum allowing volatization of a majority of the hydrogen in the samples. During sintering, the samples were supported on a NbC powder parting agent.

The sintered sample had A-2 porosity in the enriched zone and A-4 porosity in the nonenriched bulk of sample. The sample had an average Rockwell "A" hardness of 90; a zone of solid solution depletion 9.8 microns thick; and a coercive force, Hc, of 150 oersteds.

EXAMPLE NO. 15

A batch of material having a composition equivalent to the Example 9 batch was blended, milled and pressed into insert blanks. The blanks were then sintered, ground, heat treated and ground (flank faces only) in substantial accordance with the procedures used in Example 9. However, a 60 degrees Centigrade/hour cooling rate was used in the final heat treatment.

Figure 2:
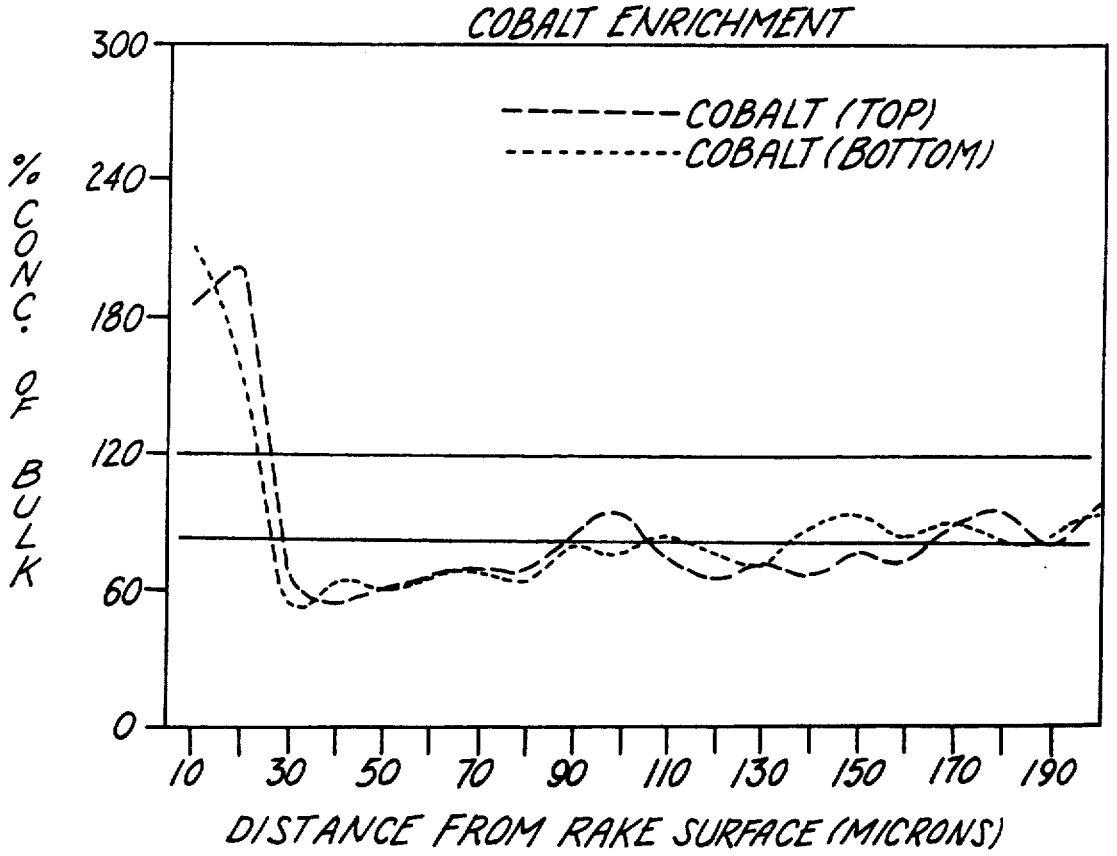
FIG. 2 is a graphical representation of the typical levels of cobalt enrichment produced in a cemented carbide body according to the present invention as a function of depth below its rake surfaces.

An insert was analyzed by EDX line scan analysis at various distances from the insert rake surfaces. The results of this analysis is shown in the FIG. 2 graph. It indicates the existence of a cobalt enriched layer extending inwardly from the rake surfaces to a depth of approximately 25 microns followed by a layer of material partially depleted in cobalt extending inwardly to approximately 90 microns from the rake surfaces. While not shown in the FIG. 2 graph, partial solid solution depletion has been found in the cobalt enriched layer and solid solution enrichment has been found in the partially depleted cobalt layer.

The two horizontal lines indicate the typical scatter in analysis of the bulk material around the nominal blend chemistry.

The preceding description and detailed examples have been provided to illustrate some of the possible alloys, products, processes and uses that are within the scope of this invention as defined by the following claims.

What is claimed is:

1. A cemented carbide body formed by sintering a substantially homogeneous mixture of constituents comprising: a least 70 weight percent tungsten carbide; a metallic binder; a [metal] *second* carbide selected from the group consisting of the Group IVB and VB transition metal carbides; said metal carbide being present in an amount less than the amount of tungsten carbide; said body having substantially A to B type porosity throughout said body; said metal carbide combined with said tungsten carbide forming a solid solution carbide; a *first* layer of *binder enriched and* at least partially solid solution carbide depleted material [near] *beginning at and extending inwardly from* a peripheral surface of said body, *the content of said binder present in the first layer reaching between about 150 percent and about 300 percent of the average binder content of the cemented carbide body; and a hard dense refractory coating bonded to the peripheral surface of the cemented carbide body.*

2. A cemented carbide body according to claim 1 wherein said binder is selected from the group consisting of cobalt, nickel, iron and their alloys.

[3. A cemented carbide body formed by sintering a substantially homogeneous mixture of constituents comprising: at least 70 weight percent tungsten carbide; a cobalt binder alloy; a metal carbide selected from the group consisting of the Group IVB and VB transition metal carbides; said metal carbide combined with said tungsten carbide forming a solid solution carbide; a layer of at least partially solid solution depleted material near a peripheral surface of said body; and wherein said cobalt binder alloy has an overall magnetic saturation value of less than 158 gauss-cm$^3$/gm cobalt.]

[4. A cemented carbide body according to claim 3 wherein said cobalt binder alloy has an overall magnetic saturation value of approximately 145 to 157 gauss-cm$^3$/gm cobalt.]

[5. A cemented carbide body according to claim 3 wherein said cobalt binder alloy has an overall magnetic saturation value of less than 126 gauss-cm$^3$/gm cobalt.]

6. A cemented carbide body comprising: at least 70 weight percent [tugnsten] *tungsten* carbide; cobalt; a metal carbide selected from the group consisting of the Group IVB and VB transition metal carbides; a layer of cobalt enrichment near a peripheral surface of said body; said body having substantially A to B type porosity throughout *and wherein the cobalt enriched layer has a cobalt content at said peripheral surface equal to 1.5 to 3 times the average cobalt content of the body.*

7. The cemented carbide, body according to claim 6 wherein the level of said transition metal carbide in said layer of cobalt enrichment is at least partially depleted.

8. A cemented carbide body according to claims 6 or 7 wherein said metal carbide is selected from the group consisting of titanium *carbide*, hafnium *carbide*, tantalum *carbide* and niobium *carbide*.

9. A cemented carbide body according to claims 6 or 7 wherein said metal carbide is present at the level of at least 0.5 weight percent.

10. A cemented carbide body according to claim 8 wherein said metal carbide is present at the level of at least 0.5 weight percent.

[11. A cemented carbide body according to claims 6 or 7 wherein the cobalt enriched layer has a cobalt content at said peripheral surface equal to 1.5 to 3 times the average cobalt content of the body.]

[12. A cemented carbide body according to claim 6 wherein the cobalt enriched layer extends inwardly from said peripheral surface of said body to a minimum depth of substantially 6 microns.]

13. A cemented carbide body according to claim [11] 6 wherein the cobalt enriched layer extends inwardly from said peripheral surface of said body to a minimum depth of substantially 6 microns.

[14. A cemented carbide body according to claim 12 wherein the cobalt enriched layer extends inwardly from said peripheral surface of said body to a depth of 12 to 50 microns.]

15. A cemented carbide body according to claim 13 wherein the cobalt enriched layer extends inwardly from said peripheral surface of said body to a depth of 12 to 50 microns.

16. A cemented carbide body accoring to [claims 6 or 14] *claim 6*, wherein said peripheral surface of said body comprises a rake face; said rake face joined to a flank face; a cutting edge located at the junction of said rake and flank faces; and wherein said enriched layer extends inwardly from said rake face.

17. A cemented carbide body according to claim 16 further comprising a hard dense refractory coating bonded to said peripheral surface of said body, and said coating having one or more layers.

18. The cemented carbide body according to claim [17] *100* wherein the material comprising said layer is selected from the group consisting of the carbides, nitrides, borides and carbonitrides of titanium, zirconium, hafnium, niobium, tantalum, vanadium, and the oxide and oxynitride of aluminum.

19. The cemented carbide body according to claim [17] wherein said coating comprises a layer of titanium carbide.

20. The cemented carbide body according to claim [17] *100* wherein said coating comprises a layer of titanium carbonitride.

21. The cemented carbide body according to claim [17] *100* wherein said coating comprises a layer of titanium carbide and a layer of titanium nitride.

22. The cemented carbide body according to claim 21 wherein said coating further comprises a layer of titanium carbonitride.

23. The cemented carbide body according to claim [17] *100* wherein said coating comprises a layer of aluminum oxide.

24. The cemented carbide body according to claim 23 wherein said coating further comprises a layer of titanium carbide.

25. The product prepared by the process of forming a binder enriched layer near a peripheral surface of a substantially A to B type porosity cemented carbide body, in which said process comprises: milling and blending a first carbide powder, a binder alloy powder and a chemical agent powder selected from the group consisting of metals, alloys, nitrides and carbonitrides of Group IVB and VB transition metals; pressing a compact utilizing said powders; sintering said compact at a temperature above the binder alloy melting temperature so as to transform, at least partially, the chemical agent to a carbide in the layer to be binder enriched; removing said binder enriched layer in selected areas of said product; resintering said compact at a temperature above the binder alloy melting temperatures so as to transform, at least partially, the chemical agent to a carbide in the layer near the peripheral surface of the selected area of the product.

26. The product of claim 25 further comprising the step of: depositing on said peripheral surface of the product an adherent hard wear resistant refractory coating having one or more layers.

27. The product of claim 26 wherein the material comprising each of said layers is selected from the group consisting of the carbides, nitrides and carbonitrides of titanium, zirconium, hafnium, niobium, tantalum and vanadium, and the oxide and oxynitride of aluminum.

28. The product of claim 25 wherein said first carbide powder comprises tungsten carbide and said tungsten carbide comprises at least 70 weight percent of the product.

29. The product according to claim 28 wherein said binder is selected from the group consisting of cobalt, nickel, iron and their alloys.

30. A process for forming a cobalt binder enriched layer near a peripheral surface of a substantially A type porosity cemented carbide body, said process comprising the steps of: milling and blending powders comprising tungsten carbide, cobalt and a metal compound selected from the group consisting of nitrides, and carbonitrides of Group IVB and VB transition metals, *and*

*the adding of free carbon as during milling and blending in an amount sufficient to produce a tungsten lean cobalt binder in the sintered compact*; pressing a compact utilizing said powders; sintering said compact at a temperature above the melting temperature of said binder so as to transform, at least partially, the metal compound to a metal carbide in the layer to be binder enriched; *and removing said binder enriched layer in selected areas of said peripheral surface.*

[31. The process according to claims 30 further comprising the step of: removing said binder enriched layer in selected areas of said peripheral surface.]

32. The process according to claim 30 further comprising the step of: depositing on said peripheral surface an adherent hard wear resistant coating having one or more layers wherein the material comprising each of said layers is selected from the group consisting of the carbides, nitrides, borides and carbonitrides of titanium, zirconium, hafnium, niobium, tantalum and vanadium, and the oxide and the oxynitride of aluminum.

33. The process according to claim 30 wherein said powders further comprise a second carbide powder selected from the group consisting of the Group IVB and VB metal carbides and their solid solutions.

34. The process according to claim 30 further comprising the step of at least partially volatilizing an element selected from the group consisting of hydrogen and nitrogen during the sintering step.

[35. The process according to claim 31 further comprising the addition of free carbon as during milling and blending in an amount sufficient to produce a tungsten lean cobalt binder in the sintered compact.]

*36. The cemented carbide body according to claim 1 wherein said binder is present in an amount up to about 10 weight percent.*

*37. A cemented carbide body according to claim 1 further including nitrogen present as a carbonitride in a solid solution of said tungsten and second carbide.*

*38. A cemented carbide body according to claim 37 wherein said carbonitride is a tungsten titanium carbonitride.*

*39. A cemented carbide body according to claim 1 wherein said second carbide is present at the level of at least 0.5 weight percent.*

*40. A cemented carbide body according to claim 1 wherein said second carbide is present in an amount between 0.5 and 2 weight percent.*

*41. The cemented carbide body according to claim 1 further including a second layer of partial metallic binder depletion beneath and separate from said first layer.*

*42. The cemented carbide body according to claim 41 wherein the bulk substrate is beneath said second layer.*

*43. The cemented carbide body according to claim 1 wherein said first layer extends inwardly from the peripheral surface a distance between about 12 microns to about 50 microns.*

*44. The cemented carbide body according to claim 1 wherein the first layer extends inwardly from the peripheral surface a distance between about 6 and about 125 microns.*

*45. The cemented carbide body according to claim 1 wherein said second carbide is a cubic carbide selected from the group consisting of tantalum carbide, niobium carbide, titanium carbide, vanadium carbide, hafnium carbide and zirconium carbide.*

*46. The cemented carbide body according to claim 45 wherein the metallic binder is cobalt, and the cobalt is present in an amount between about 5 and 10 weight percent.*

*47. The cemented carbide body according to claim 46 wherein the cubic carbide content is not greater than about 20 weight percent.*

*48. The cemented carbide body according to claim 1 wherein the binder is cobalt, and the first layer has a cobalt content between about 1.75 and about 3.0 times the average cobalt content of the cemented carbide body.*

*49. The cemented carbide body according to claim 1 wherein said metallic binder is cobalt and said cobalt is present as a cobalt binder alloy, and said cobalt binder alloy has an overall magnetic saturation value of between approximately 145 to approximately 157 gauss-cm$^{-3}$/gm cobalt.*

*50. The cemented carbide body according to claim 1 wherein the first layer has a binder content between about 2.0 and about 3.0 times the average binder content of the cemented carbide body.*

*51. The cemented carbide body according to claim 1 wherein said binder is cobalt and the cobalt is present in said body as a cobalt alloy, and said cobalt alloy has an overall magnetic saturation value of less than 158 gauss-cm$^{-3}$/gm cobalt.*

*52. A cemented carbide body according to claim 6 wherein the cobalt enriched layer has a cobalt content reaching between about 1.75 and about 3.0 times the average cobalt content of the body.*

*53. A cemented carbide body according to claim 6 wherein the cobalt enriched layer has a cobalt content reaching between about 2.0 and about 3.0 times the average cobalt content of the body.*

*54. The cemented carbide body according to claim 6 wherein said cobalt is present as a cobalt binder alloy having an overall magnetic saturation value of less than 158 gauss-cm$^{-3}$/gm cobalt and at least 139 gauss-cm$^{3}$/gm cobalt.*

*55. The product of claim 25 wherein in said cemented carbide body said binder alloy is a cobalt alloy, and said cobalt alloy has an overall magnetic saturation value of between approximately 145 to approximately 157 gauss-cm$^{-3}$/gm cobalt.*

*56. A coated cemented carbide cutting insert comprising:*

*a cemented carbide body configured so as to present a rake face joined to a flank face, a cutting edge located at the juncture of the rake and flank faces;*

*said cemented carbide body formed by sintering a substantially homogenous mixture of constituents, the body comprising:*

*at least 70 weight percent of tungsten carbide;*

*between about 3 weight percent and about 10 weight percent of cobalt;*

*a solid solution of tungsten carbide and a carbide of a second metal, the second metal selected from the group consisting of titanium, hafnium, tantalum and niobium;*

*a zone of cobalt enrichment being at and extending inwardly from the peripheral surface of the rake face wherein the zone of cobalt enrichment has a cobalt content equal to about 1.5 to about 3 times the average cobalt content of the cemented carbide body, cobalt enrichment being absent from the flank face, said cobalt being present as a cobalt binder alloy wherein said cobalt binder alloy has an overall magnetic saturation value of less than 158 gauss-cm$^{3}$/gm cobalt; and*

*a hard dense refractory coating bonded to the peripheral surfaces of said cemented carbide body including the*

*peripheral surfaces of the rake and flank faces, and said coating having one or more layers.*

*57. The cutting insert according to claim 56 wherein said coating comprises a layer of titanium carbide.*

*58. The cutting insert according to claim 56 wherein said coating comprises a layer of titanium carbonitride.*

*59. The cutting insert according to claim 56 wherein said coating comprises a layer of titanium nitride.*

*60. The cutting insert according to claim 56 wherein said coating comprises a layer of aluminum oxide.*

*61. The cutting insert according to claim 56 wherein the zone of cobalt enrichment further exhibits solid solution carbide depletion to some degree.*

*62. The cutting insert according to claim 61 wherein the cemented carbide body exhibits an absence of solid solution carbide depletion from the flank face.*

*63. The cutting insert according to claim 56 wherein the cemented carbide body includes a zone of cobalt depletion to some degree and solid solution enrichment beneath the zone of cobalt enrichment.*

*64. The cutting insert according to claim 56 wherein the cobalt enriched zone extends inwardly from the peripheral surface of the rake face to a minimum depth of approximately 6 microns.*

*65. The cutting insert according to claim 56 further including nitrogen present as a carbonitride in a solid solution of the tungsten carbide and second metal carbide.*

*66. The cutting insert according to claim 56 wherein said cobalt binder alloy has an overall magnetic saturation value of between approximately 145 to approximately 157 gauss-cm$^3$/gm cobalt.*

*67. The cutting insert according to claim 56 wherein the zone of cobalt enrichment reaches a level of between about 175 percent and about 300 percent of the average cobalt content of the cemented carbide body.*

*68. The cutting insert according to claim 56 wherein the zone of cobalt enrichment reaches a level of between about 200 percent and about 300 percent of the average cobalt content of the cemented carbide body.*

*69. The coated cemented carbide cutting insert according to claim 56 wherein said cobalt binder alloy has an overall magnetic saturation value of less than 158 gauss-cm$^3$/gm cobalt and at least 139 gauss-cm$^3$/gm cobalt.*

*70. A process for forming a cobalt enriched layer at a peripheral surface of a cemented carbide body, said process comprising the steps of:*

*obtaining a compact having a substantially uniform distribution of a first carbide, an amount between about 3 and about 10 weight percent of cobalt, and an amount greater than approximately 0.5 weight percent of a chemical agent selected from the group consisting of the nitrides and carbonitrides of transition metals whose carbides have a free energy of formation more negative than said first carbide at a temperature above the binder carbon eutectic;*

*densifying said compact;*

*transforming, at least partially, said chemical agent to a solid solution with said first carbide by a heat treatment; and*

*increasing the cobalt content at said peripheral surface during said heat treatment resulting in the cemented carbide body having a cobalt enriched layer beginning at and extending inwardly from the peripheral surface wherein the cobalt content in the cobalt enriched layer is between about 150 percent and about 300 percent of the average cobalt content of the cemented carbide body, and the cobalt being present as a cobalt binder alloy wherein the cobalt binder alloy has a magnetic saturation value of less than 158 gauss-cm$^3$/gm cobalt.*

*71. The process according to claim 70 wherein the chemical agent is present in an amount between 0.5 and 2 weight percent.*

*72. The process according to claim 70 wherein the chemical agent is titanium nitride.*

*73. The process according to claim 70, wherein the chemical agent is titanium carbonitride.*

*74. The process according to claim 70 wherein said cobalt binder alloy has an overall magnetic saturation value of between approximately 145 to approximately 157 gauss-cm$^{-3}$/gm cobalt.*

*75. The process according to claim 70 wherein said cobalt binder alloy has an overall magnetic saturation value of less than 158 gauss-cm$^{-3}$/gm cobalt and at least 139 gauss-cm$^3$/gm cobalt.*

*76. A process for forming a binder enriched layer near a peripheral surface of a cemented carbide body, said process comprising the steps of:*

*obtaining a compact having a substantially uniform distribution of a first carbide, an amount between about 3 and about 10 weight percent of a binder metal, and an amount greater than approximately 0.5 weight percent of a chemical agent selected from the group consisting of the nitrides and carbonitrides of transition metals whose carbides have a free energy of formation more negative than said first carbide at a temperature above the binder carbon eutectic:*

*densifying said compact;*

*transforming, at least partially, said chemical agent to a solid solution with said first carbide by a first heat treatment;*

*increasing the binder content near said peripheral surface during said first heat treatment;*

*removing the zone of increased binder content from at least a portion of the peripheral surface of the body;*

*subjecting the cemented carbide body to a second heat treatment so as to increase the binder content near the portion of the peripheral surface previously removed.*

*77. The process according to claim 76 further including the step of applying a hard dense refractory coating to the body.*

*78. A process for fabricating a cutting insert said process comprising the steps of:*

*obtaining a compact having a substantially uniform distribution of a first carbide, an amount not greater than about 10 weight percent of a binder metal, and an amount greater than approximately 0.5 weight percent of a chemical agent selected from the group consisting of the nitrides and carbonitrides of transition metals whose carbides have a free energy of formation more negative than said first carbide at a temperature above the binder carbon eutectic;*

*densifying said compact into a configuration presenting a rake face joined to a flank face wherein a cutting edge is located at the juncture of the rake and flank faces;*

*transforming, at least partially, said chemical agent to solid solution with said first carbide by a first heat treatment while maintaining some nitrogen in the form of a nitride or carbonitride as a constituent of the compact;*

*increasing the binder content near said peripheral surface of the rake and flank faces during said first heat treatment;*

*removing the binder enriched layer from at least one portion of the peripheral surface of the compact;*

*subjecting the compact to a second heat treatment so as to increase the binder content near the one portion of the peripheral surface of the compact; and*

*depositing on said peripheral surface of the cemented carbide body an adherent hard wear resistant coating having one or more layers wherein the material comprising each of said layers is selected from the group consisting of the carbides, nitrides, borides and carbonitrides of titanium, zirconium, hafnium, niobium, tantalum and vanadium, and the oxide and the oxynitride of aluminum.*

*79. The process according to claim 78 wherein the chemical agent is present in an amount between 0.5 and 2 weight percent.*

*80. The process according to claim 78 wherein a portion of the nitrogen present in the compact prior to the first heat treatment is volatilized during the first heat treatment.*

*81. The process according to claim 80 wherein a portion of the nitrogen present in the compact after the first heat treatment and prior to the second heat treatment is volatilized during the second heat treatment.*

*82. The process according to claim 78 wherein the first and second heat treatments occur at a temperature over the melting point of the binder metal.*

*83. The process according to claim 78 wherein the transition metals include titanium, tantalum, hafnium and niobium.*

*84. The process according to claim 78 further comprising the addition of free carbon as during milling and blending in an amount sufficient to produce a tungsten lean cobalt binder in the sintered compact.*

*85. The process according to claim 84 wherein one-half mole of the free carbon is added per mole of starting nitrogen.*

*86. The process according to claim 78 wherein the chemical agent is titanium nitride.*

*87. The process according to claim 78 wherein the binder enrichment is removed from an area adjacent the peripheral surface of the flank face after the first heat treatment and before the second heat treatment.*

*88. A process for fabricating a coated cemented carbide cutting insert, said process comprising the steps of:*

*obtaining a compact having a substantially uniform distribution of a first carbide, an amount of binder metal not greater than about 10 weight percent; and an amount between approximately 0.5 and 2 weight percent of a chemical agent selected from the group consisting of the nitrides and carbonitrides of the Group IVB and VB transition metals;*

*densifying said compact into a configuration presenting a rake face joined to a flank face wherein a cutting edge is located at the juncture of the rake and flank faces;*

*liquid phase sintering the configured compact in an atmosphere having the nitrogen vapor pressure below its equilibrium pressure so as to transform, at least partially, said chemical agent to solid solution with said first carbide while maintaining some nitrogen in the form of a nitride or carbonitride as a constituent of the compact;*

*increasing the binder content of the compact in a zone near the peripheral surface of the rake and flank faces during the liquid phase sintering;*

*removing the binder enriched zone from at least one portion of the peripheral surface of the compact;*

*subjecting the compact to a heat treatment in an atmosphere having the nitrogen vapor pressure below its equilibrium vapor pressure so as to increase the binder content near the one portion of the peripheral surface of the compact; and*

*depositing on said peripheral surface of the cemented carbide compact an adherent hard wear resistant coating having one or more layers wherein the material comprising each of said layers is selected from the group consisting of the carbides, nitrides borides and carbonitrides of titanium, zirconium, hafnium, niobium, tantalum and vanadium, and the oxide and the oxynitride of aluminum.*

*89. The process according to claim 88 wherein the pressure during the liquid phase sintering and the heat treatment is between about 0.1 and about 0.15 torr.*

*90. A cemented carbide body of substantially A to B porosity and having a binder enriched zone at the peripheral surface of the body produced by a process comprising the steps of:*

*obtaining a compact having a substantially uniform distribution of a first carbide, an amount between about 3 and about 10 weight percent of a binder metal, and an amount greater than approximately 0.5 weight percent of a chemical agent selected from the group consisting of the nitrides and carbonitrides of transition metals whose carbides have a free energy of formation more negative than said first carbide at a temperature above the binder carbon eutectic;*

*densifying said compact;*

*transforming, at least partially, said chemical agent to a solid solution with said first carbide by a heat treatment; and*

*increasing the binder content in a zone at said peripheral surface during said heat treatment wherein the level of cobalt in the zone is between about 175 percent and about 300 percent of the average cobalt content of the cemented carbide body.*

*91. The cemented carbide body according to claim 90 wherein the transforming step includes:*

*liquid phase sintering the compact in an atmosphere wherein the nitrogen partial pressure is below its equilibrium vapor pressure.*

*92. The cemented carbide body according to claim 90 wherein the level of binder in the zone reaches a level of between about 200 percent and about 300 percent of the average binder content of the cemented carbide body.*

*93. The cemented carbide body according to claim 90 wherein said binder metal is cobalt and said cobalt is present as a cobalt binder alloy, and said cobalt binder alloy has an overall magnetic saturation value of less than 158 gauss-cm$^3$/gm cobalt and at least 139 gauss-cm$^3$/gm cobalt.*

*94. A cemented carbide body having a binder enriched zone near the peripheral surface of the body produced by a process comprising the steps of:*

*obtaining a compact having a substantially uniform distribution of a first carbide, an amount between about 3 and about 10 weight percent of a binder metal, and an amount greater than approximately 0.5 weight percent of a chemical agent selected from the group consisting of the nitrides and carbonitrides of transition metals whose carbides have a free energy of formation more negative than said first carbide at a temperature above the binder carbon eutectic;*

*densifying said compact;*

*transforming, at least partially, said chemical agent to a solid solution with said first carbide by a first heat treatment comprising liquid phase sintering the compact in an atmosphere wherein the nitrogen partial pressure is below its equilibrium vapor pressure;*

*increasing the binder content in a zone near said peripheral surface during said first heat treatment;*

*removing the binder enriched zone at selected areas of the peripheral surface; and*

*subjecting the compact to a second heat treatment in an atmosphere wherein the nitrogen partial pressure is below its equilibrium vapor pressure so as to increase the binder content near the selected areas of the peripheral surface.*

*95. The cemented carbide body according to claim 94 further comprising the step of coating the peripheral surface of the cemented carbide body with a hard dense refractory coating after the second heat treatment.*

*96. The cemented carbide body according to claim 94 further comprising the step of coating the peripheral surface of the cemented carbide body with a hard dense refractory coating.*

*97. A coated cemented carbide cutting insert comprising:*

*a cemented carbide body configured so as to present a rake face joined to a flank face, a cutting edge located at the juncture of the rake and flank faces, the body comprising:*

*at least 70 weight percent tungsten carbide;*

*between about 3 weight percent and about 10 weight percent of cobalt, said cobalt being present as a cobalt binder alloy, said cobalt binder alloy having an overall magnetic saturation value between about 145 and about 157 gauss-cm$^3$/gm cobalt;*

*a solid solution of tungsten carbide and a carbide of a second metal wherein said second metal is selected from the group consisting of titanium, hafnium, tantalum and niobium;*

*a zone of cobalt enrichment being at and extending inwardly from a ground peripheral surface of a selected one of the faces, the cobalt content in the zone of cobalt enrichment reaching between about 150 percent and about 300 percent of the average cobalt content of the cemented carbide body; and*

*a hard dense refractory coating bonded to the peripheral surface of the cemented carbide body.*

*98. The coated cemented carbide cutting insert according to claim 97 wherein the rake face has a ground peripheral surface.*

*99. The coated cemented carbide cutting insert of claim 97 wherein the cobalt content in the zone of cobalt enrichment ranges between about 200 percent and about 300 percent of the average cobalt content of the cemented carbide body.*

*100. A cemented carbide body comprising at least 70 weight percent tungsten carbide; cobalt; a metal carbide selected from the group consisting of the Group IVB and VB transition metal carbides; a layer of cobalt enrichment near a peripheral surface of said body wherein the cobalt enriched layer extends inwardly from said peripheral surface of said body to a depth of 12 to 50 microns and wherein the cobalt content in the cobalt enriched layer reaches between about 150 percent and about 300 percent of the average cobalt content of the cemented carbide body; said body having substantially A to B type porosity throughout; said peripheral surface of said body comprises a rake face; said rake face joined to a flank face; a cutting edge located at the juncture of said rake and flank faces; and wherein said enriched layer extends inwardly from said rake face; a hard dense refractory coating bonded to said peripheral surface of said body, and said coating having one or more layers.*

*101. The cemented carbide body according to claim 100 wherein said cobalt is present as a cobalt binder alloy which has an overall magnetic saturation value of between approximately 145 to approximately 157 gauss-cm$^{-3}$/gm cobalt.*

*102. The cemented carbide body according to claim 100 wherein the cobalt content in the cobalt enriched layer reaches a level between about 175 percent and about 300 percent of the average cobalt content of the cemented carbide body.*

*103. The cemented carbide body according to claim 100 wherein the cobalt content in the cobalt enriched layer reaches a level between about 200 percent and about 300 percent of the average cobalt content of the cemented carbide body.*

*104. The cemented carbide body according to claim 100 wherein said cobalt is present in a cobalt binder alloy having an overall magnetic saturation value of less than 158 gauss-cm$^3$/gm cobalt and at least 139 gauss-cm$^3$/gm cobalt.*

*105. A cemented carbide body comprising: at least 70 weight percent tungsten carbide; cobalt; a metal carbide selected from the group consisting of the Group IVB and VB transition metal carbides; a layer of cobalt enrichment near a peripheral surface of said body wherein the level of cobalt enrichment in the cobalt enriched layer reaches 150 to 300 percent the average cobalt content of the body; said body having substantially A to B type porosity throughout.*

*106. The cemented carbide body according to claim 105 wherein said cobalt is present as a cobalt binder alloy which has an overall magnetic saturation value of between approximately 145 to approximately 157 gauss-cm$^{-3}$/gm cobalt.*

*107. The cemented carbide body according to claim 105 wherein said cobalt is present as a cobalt binder alloy having an overall magnetic saturation value of less than 158 gauss-cm$^3$/gm cobalt and at least 139 gauss-cm$^3$/gm cobalt.*

* * * * *

UNITED STATES PATENT AND TRADEMARK OFFICE

CERTIFICATE OF CORRECTION

PATENT NO. : Re 34,180

DATED : February 16, 1993

INVENTOR(S) : Nemeth and Grab

It is certified that error appears in the above-identified patent and that said Letters Patent is hereby corrected as shown below:

In column 7, line 29, the words -- to 6.1mm-- should appear after the term "5.8mm".

In column 13, line 66, the term "Wc" should read --WC--.

In column 16, line 20, the heading "STAGE II" should be added.

In column 18, line 24, the term "60" should be --69--.

In column 20, line 10, the number --100-- should be inserted after "[17]".

In column 22, line 24, after the word "cobalt" the words --and at least 139 gauss-$cm^3$/gm cobalt-- should be added.

Signed and Sealed this

Twenty-fourth Day of May, 1994

*Attest:*

Bruce Lehman

BRUCE LEHMAN

*Attesting Officer*

*Commissioner of Patents and Trademarks*